United States Patent [19]

Gomez

[11] E Re. 30,491

[45] Reissued Jan. 27, 1981

[54] APPARATUS FOR BINDING LOOSE SHEETS

[75] Inventor: Albert Gomez, N. Merrick, N.Y.

[73] Assignee: Spiral Binding Company, Inc., Clifton, N.J.

[21] Appl. No.: 871,127

[22] Filed: Jan. 19, 1978

Related U.S. Patent Documents

Reissue of:

[64] Patent No.: 4,020,516
Issued: May 3, 1977
Appl. No.: 635,735
Filed: Nov. 26, 1975

[51] Int. Cl.[2] ..... B42C 19/00

[52] U.S. Cl. ..... 11/1 A; 140/92.3

[58] Field of Search ..... 11/1 A, 1 R, 1 AC; 140/92.3, 92.94, 93.2; 281/21 RA, 25 RA

[56] References Cited

U.S. PATENT DOCUMENTS

| | | | |
|---|---|---|---|
| 2,273,824 | 2/1942 | Barrett | 11/1 A |
| 2,377,340 | 6/1945 | Grinnell | 11/1 A X |
| 2,930,054 | 3/1960 | Bardy | 11/1 A |
| 3,555,587 | 1/1971 | Seaborn | 11/1 A |

*Primary Examiner*—William R. Briggs
*Attorney, Agent, or Firm*—Charles E. Baxley

[57] ABSTRACT

The apparatus includes a binding station, means for supporting the straight fingers of a flat comb-like wire binder so that the fingers with the tips thereof foremost are directed toward the binding station, means engageable with the binder for pushing the fingers thereof into the station, and means at the station for progressively bending the fingers into circular form, the supporting means including means to prevent the portions of the binder fingers between the pushing means and the bending means becoming bent under the action of the pushing means, and the pushing means pushing the bent fingers through the perforations of the book to be bound and until the tip ends thereof become situated in the roots of the fingers. The bending means comprises two die members and a mandrel. The mandrel may be a single rod-like member, or may be a split mandrel composed of elements provided on the two die members.

26 Claims, 18 Drawing Figures

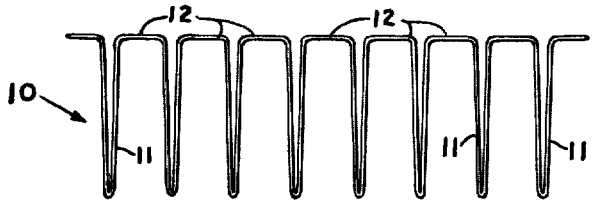
FIG. 1
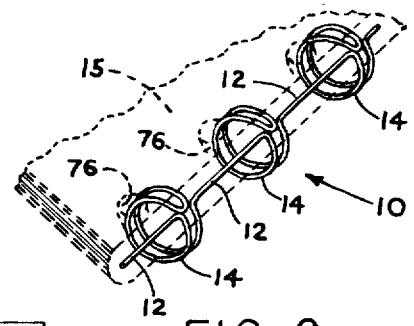
FIG. 2
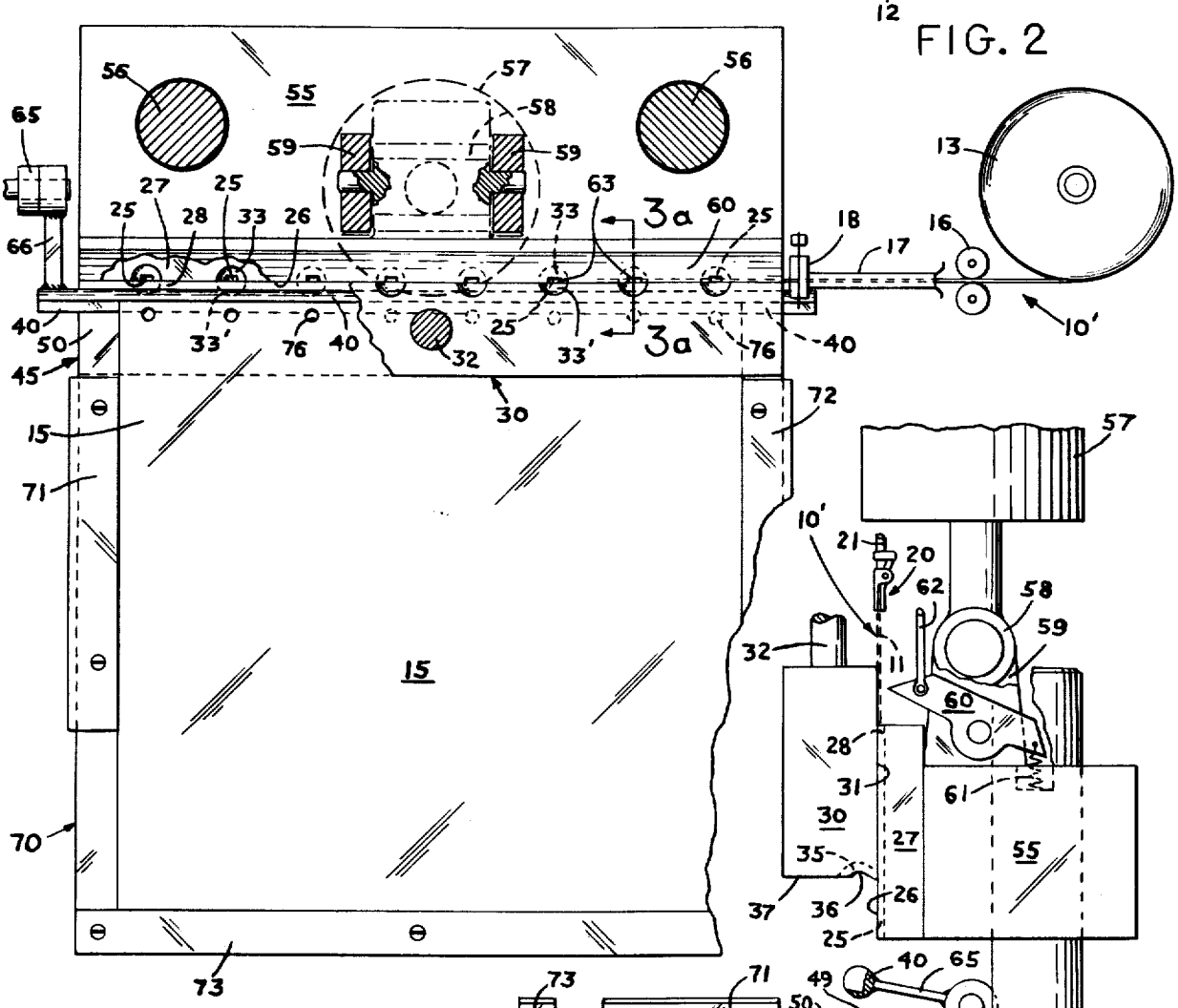
FIG. 3
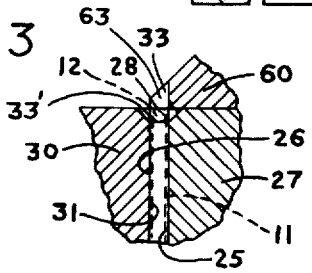
FIG. 3a
FIG. 4

APPARATUS FOR BINDING LOOSE SHEETS

Matter enclosed in heavy brackets [ ] appears in the original patent but forms no part of this reissue specification; matter printed in italics indicates the additions made by reissue.

THE INVENTION

This invention relates to the binding of books of loose perforated sheets by wire binding elements, each composed of a wire that has been formed into a series of spaced ring-like members for binding the sheets together and a series of lengths of wire uniting such ring-like members.

Binding elements of the indicated type are usually initially shaped by bending out of a straight wire, regularly spaced straight elongated loops or fingers connected together at their open roots by aligned equal lengths of wire to form a flat comb-like structure of indefinite length, and then bending the fingers out of the plane in which they are formed into substantially C-shaped configurations. With the fingers of a certain length of such bent wire in this condition, a sufficient number of perforated sheets can readily be impaled on the closed tips of the fingers and the binding of such sheets then completed by further bending the fingers to bring them to a fully-closed, ring-like form.

While the aforesaid method of binding by impaling sheets on the partially closed fingers of a wire binder and then completing the binding by bending the fingers to their fully closed condition is the present usual method of binding loose disadvantages it has certain inherent disadvantage which render its practice not entirely satisfactory. Obviously, such a method requires a number of forming steps and the handling of a partially formed pliant wire, all of which requires the employment of expensive machinery for in carrying out such forming and handling, care must be exercised in preventing the partially formed fingers and tie-rods of the binder from becoming distorted from their desired formed condition because of the flexibleness and resiliency of the wire.

It is the primary purpose of the present invention to provide a simple, less expensive method of binding loose leaf books with binding elements of the indicated type.

Another object of the invention is to provide a method and a machine in which the binding is effected by introducing a binding element in the aforesaid flat comb-like condition into the machine and directly completing in one step the binding of a book of sheets with such a binder element.

Other objects, as well as the advantages and novel features of the invention, will appear from a perusal of the following description, when read in connection with the accompanying drawings, in which FIG. 1 is a plan view showing a length of binder strip in the condition in which it is supplied to the machine;

FIG. 2 is a perspective view showing the form into which the binder strip of FIG. 1 is directly converted by the binding operation, a portion of the bound book being shown in phantom.

FIG. 3 is a top plan view of the binding mechanism in a machine embodying the invention;

FIG. 3a is an enlarged detailed sectional view looking along the line 3a—3a of FIG. 3;

FIG. 4 is a side elevational view of the binding mechanism of the machine, as viewed from the right in FIG. 3, and showing the positions of the parts thereof prior to the binding operation;

Figure 5:
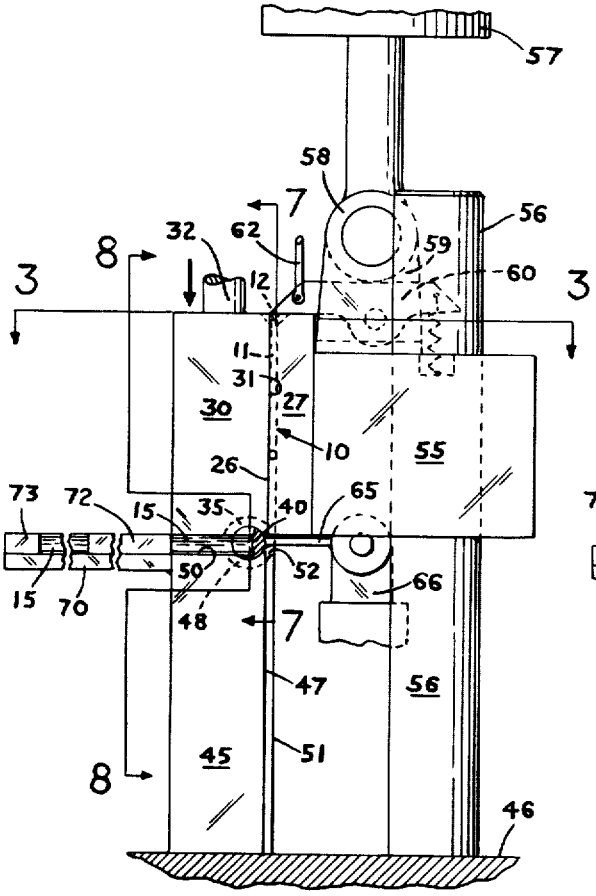
FIG. 5 is a view similar to FIG. 4 showing the binding mechanism parts in position to start the book binding operation.

Considering now FIGS. 1-3 of the drawings, the continuous length of wire from which the binding elements are formed in accordance with the method and in the machine of this invention, has been previously bent into a flat comb-like configuration and is supplied in this form to the book binder in any suitable pack, such as a reel. Such preformed wire, as is shown in the binder element generally designated by the reference numeral 10 in FIG. 1 of the drawings, comprises regularly spaced, straight, elongated loops or fingers 11 closed at their tips and open at their roots where they are connected by tie-rods 12 constituted of aligned equal lengths of the wire forming the backbone of the comb and spacing the fingers 11 so that the pitch of the latter corresponds to the pitch of the perforations in the sheets to be bound thereby. As is shown in FIG. 3 this preformed continuous wire is preferably supplied to the machine stored on a reel 13. During the binding operation, the fingers 11 are bent into the ring members 14 shown in FIG. 2, in which condition, the tips of the fingers are brought into their open root ends to lock in bound condition the sheets of the book 15 shown in phantom.

Referring now to FIGS. 3-9 of the drawings, in the machine, the reel 13 containing the stock of preformed binder 10' is rotatably supported therein in any suitable manner. The binder 10' may be fed from the reel 13 into the machine by any suitable feed means such as the feed rolls 16 illustrated, or the slide feed means disclosed in the V. Catini U.S. Pat. No. 2,891,585, dated June 23, 1959. The binder drawn from the reel 13 may be advanced through a guide 17 and past a known cutting mechanism 18 is constituted of a cutting member and a block such as shown in said U.S. Pat. No. 2,981,585 and in the Bidwell U.S. Pat. No. 2,065,505, dated Dec. 29, 1936, and which periodically severs from the advanced end of the continuous length of binder 10', a length equal to or a little shorter than that of the book of sheets 15 to be bound. The operations of the binder feed means 16 and cutting mechanism 18 are controlled by any suitable means (bot shown) such as those disclosed in said U.S. Pat. No. 2,891,585, to advance the binder in a step-by-step fashion so that when the binder comes to rest in its step-by-step advancement the desired length of binder will be severed from the continuous stock length thereof. As is shown in FIG. 1, such severance usually occurs midway of the two tie-rods 12 which form the ends of the desired length of binder element 10 and between which are located a number of fingers 11 equal to the number of perforations in the book of sheets to be bound.

At the end of a step-by-step movement of the binder strip 10', and prior to the severance of a binder element 10 from the advanced end thereof, the backbone of the advanced end portion of the binder strip is inserted between the elongated depending jaws 20 provided on the lower end of a vertical pusher bar 21 and forming an extension of the guide 17. One of the jaws 20 is fixed relative to the bar 21 and the other jaw is a movable jaw, the movement of which may be controlled by a solenoid or air pressure. The movements of the pusher bar 21 and the jaws 20 thereof are controlled by the aforesaid control means in timed relation to the binder feeding means and cutting mechanism so that during the periods of rest of the binder strip it will be gripped by the jaws 20 prior to the severing of the binder element 10, and the gripped, severed binder element then advanced by the pusher bar 21. The feeding means 16 so controls the advancement of the binder strip that the fingers 11 in the advanced end thereof will be in registration with vertical, equally spaced, grooves or slots 25 provided in the front face 26 of a vertically movable guide block 27 located below the jaws of the pusher bar 21. Thus, when the pusher bar 21 is advanced downwardly with the severed binder element 10 in the grip of its jaws 20, the fingers 11 of such element will be inserted into the upper ends of the grooves 25. The pusher bar continues this downward movement until the fingers 11 are substantially fully inserted into the grooves 25 with the tie bars 12 located in a horizontal groove 28, in FIG. 7, formed in the block 27 at the top of the vertical grooves 25.

The front face 26 of the block 27 is in sliding contact with the rear face 31 of a die block 30 mounted on the lower end of a vertically movable ram 32. Thus, the rear face 21 of the die block 30 closes the open sides of the grooves 25 to convert the covered portions of such grooves into vertical holding receivers for translating the binder fingers 11 inserted therein. As is shown more clearly in FIG. 3a of the drawings, the upper abutting edge portions of the blocks 27 and 30 are formed to provide cooperative pairs of tapered, rounded notches 33,33', respectively, which when the top surfaces of the two blocks 27,30 are flush, form conical guiding cavities directly centered above each groove 25 to accurately facilitate the entry of the closed tips of the fingers 11 into the vertical cavities 25 so formed between the blocks 27,30. As indicated, during such insertion of the fingers 11 of the severed binder element 10, the die block 30 will be partially advanced so that its top surface will be flush with the top surface of the guide block 27 as is shown in FIG. 5 of the drawings. The die block 30 has formed in its bottom end adjacently to the rear face 31 of such block, a plurality of longitudinally spaced, transverse, arcuately-shaped, open ended, die grooves 35 which are in communication throughout their lengths with a longitudinally extending arcuate groove 36. The arcuate groove 36 extends the length of the die block 30 and its inner wall has a curvature approximating the curved surface portions of a rod-like mandrel 40 which seats thereon when the die is closed to convert the straight fingers 11 of the preformed binder element shown in FIG. 1, into the ring members 14 in FIG. 2. The grooves 35 which arch around the arcuate groove 36, have an arcuate curvature similar to that of the inner wall of the groove 36 and extend to the rear face 31 of the die block 30 and to the bottom face 37 of such die block. The grooves 35 are longitudinally spaced so that their open ends in the rear block face 31 are in register with the grooves 25 in the front face 26 of the block 27 and are equal in number to the latter.

The die block 30 cooperates with a stationary die block 45 mounted on the frame 46 of the machine. The die block 45 has formed in its top end adjacently to the rear face 47 of such block, a plurality of longitudinally spaced, transverse, arcuately-shaped, open ended, die grooves 48 located in registered relation to the die grooves 35 and being in communication throughout their lengths with a longitudinally extending arcuate groove 49 disposed in opposed relation to the longitudinal groove 36. Like the grooves 35 and 36, the grooves 48 and 49 have a curvature approximating the curved surface portions of the mandrel 40. The grooves 48 extend to the rear face 47 of the die block 45 and to the top face 50 of such die block. Located in spaced relation on the rear face of the die block 45 are a plurality of spaced vertical projecting ribs 51 having formed at their upper ends a curved die surface 52 forming an extension of the inner due surface of the transverse grooves 48. The ribs 51 have a cross-sectional area approximating, but slightly less than the cross-sectional area of the grooves or slots 25 so that such ribs are slidably received in the grooves 25 as the block 27 moves downwardly in each cycle of operation of the machine (compare FIGS. 4 and 6). To accomplish this the ribs 51 which are equal in number to the number of the grooves 25 are located on the die block 45 in aligned relation to such grooves.

The block 27 is carried by a guide block 55 slidably mounted on a vertical guide post 56 standing on the machine frame 46. Vertical sliding movement is imparted to the block 55 by a ram 57 pivotally connected to a bearing 58 secured by a strap 59 to the upper end of the block 55. Pivoted on the strap 59 below the bearing 58 is a dog 60 which is normally biased to raised inoperative position as is shown in FIG. 4, by a spring 61. The dog 60 is actuated to lock a binder element 10 inserted into the grooves 25 of the block 27 by a pneumatically operated rod 62 pivotally connected to the working end of such dog. The dog 60 is mounted on the block 55 so that when it is actuated by the rod 62 to a horizontal position in which its working end engages the top surface of the block 27, as shown in FIG. 5, the working end of the dog will overlie and lock in place the tie-rods 12 of the binding element located in the longitudinal grooves 28 and prevent withdrawal of the binding element from the block 27 during the binding of the fingers 11 of the binding element. Provided in the working end of the dog 60 in alignment with the grooves 25 are a plurality of notches 63 which enable the tips of the binder fingers 11 to be inserted into spaces between the tie-rods 12 at the root ends of the fingers as is shown in FIG. 2 of the drawings.

It will be understood from the foregoing, that at the beginning of a cycle of operation of the machine and into the grooves 25 of the block 27, the block 27 and the die blocks 30 and 45 will be in the condition shown in FIG. 5. In this condition of the blocks, the block 30 will be advanced so that its upper surface will be flush with the upper surface of the block 27, the sides of the vertical grooves 25 and the longitudinal groove 28 in the block 27 will be closed by the rear face 31 of the die block 30, and the longitudinal arcuate groove 36 in the bottom face 37 of the block 30 will seat on the mandrel 40 which is resting on the longitudinal groove 49 in the top face of the die block 45, so that the inner arcuate die surfaces of the pairs of grooves 35 and 48 will be positioned an equal radial distance from the longitudinal centerline of the mandrel 40. In such condition of the blocks, the mandrel 40 is in a lowered position. It will be observed more clearly from FIGS. 8 and 9 of the drawings, that the mandrel is supported at one end only by a plate 65 which is pivotally connected at one end to a bracket member 66 for movement from a horizontal position to a raised position, as shown in dotted outline in FIG. 9, wherein the mandrel 40 will be raised from its seat 49. Means are provided in a manner known to the art to rotate the plate 65 to the horizontal position shown in full lines in FIG. 9 prior to bringing the blocks to the condition shown in FIG. 5. At the beginning of the machine cycle the dog 60 will be raised in the manner shown in FIG. 4.

Figure 6:
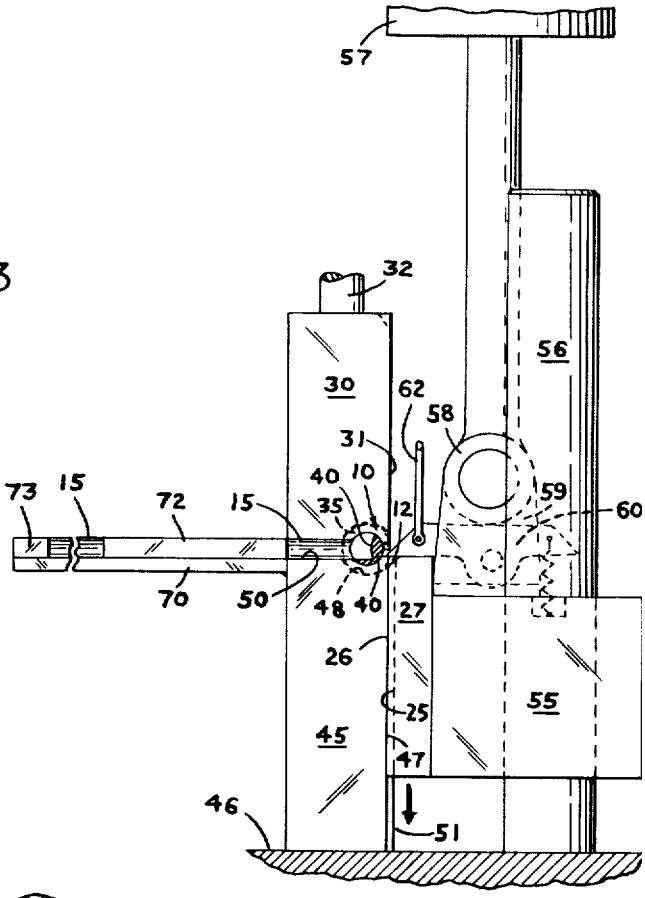
FIG. 6 is a view similar to FIG. 4 showing the relation of the parts at the end of the binding operation.
Figure 6A:
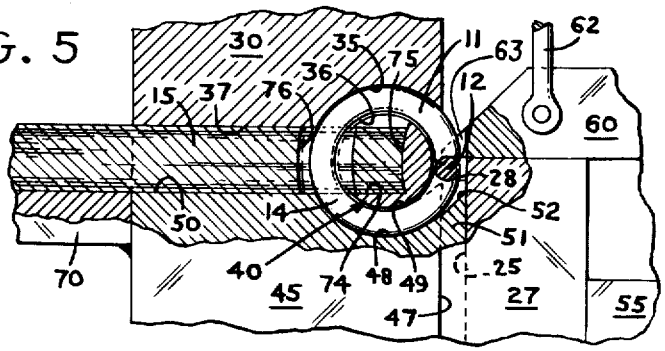
FIG. 6a is an enlarged detail, partly in section, of the coacting portions of the die parts in the relation shown in FIG. 6.
Figure 7:
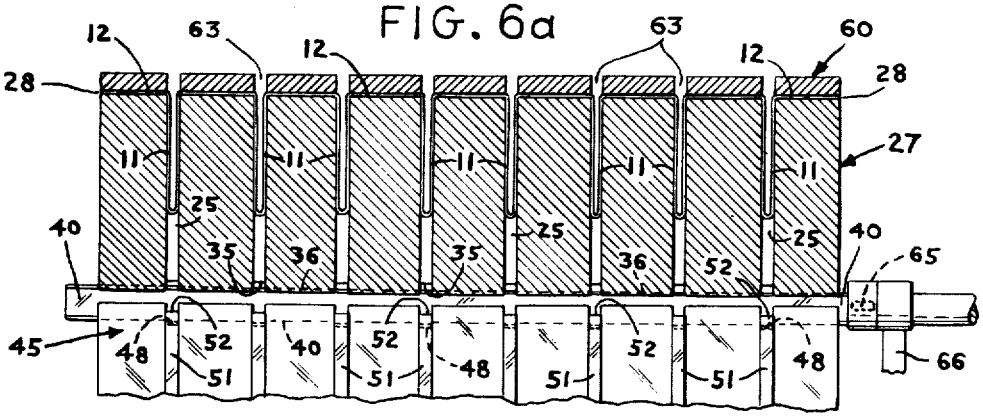
FIG. 7 is a vertical sectional view taken along the line 7—7 of FIG. 5 and showing a binder element in position for the binding operation.
Figure 8:
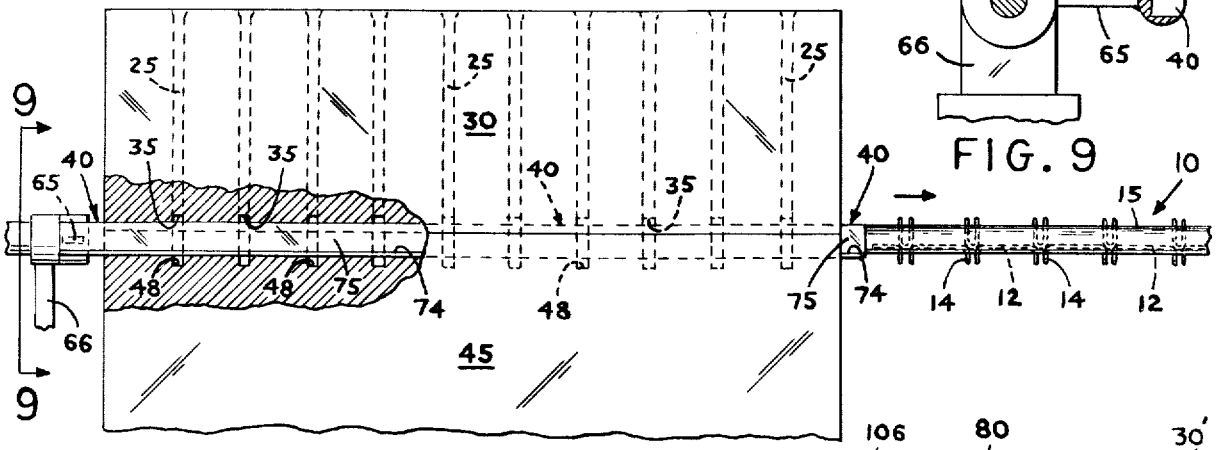
FIG. 8 is a vertical, partly sectional view taken along the line 8—8 of FIG. 5.
Figure 9:
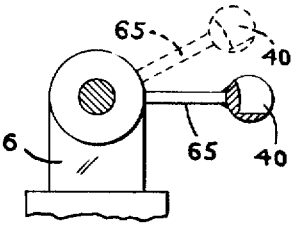
FIG. 9 is a side elevational view of the mandrel actuating parts looking along the line 9—9 of FIG. 8.
Figure 11:
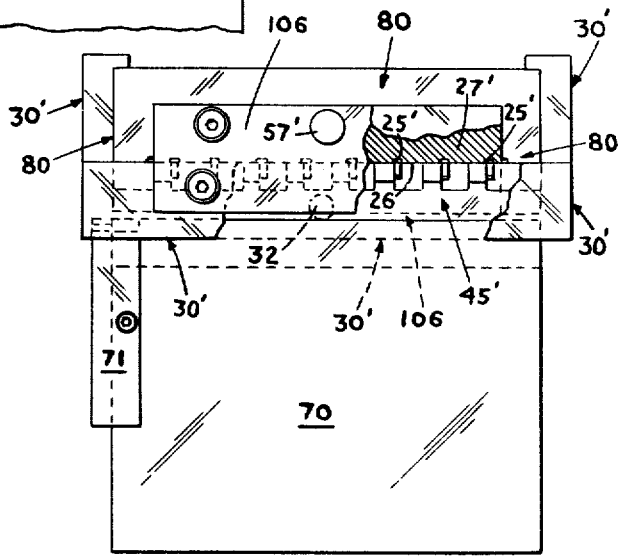
FIG. 11 is a top plan view, partly broken away, of the apparatus shown in FIG. 10.

The book 15 of loose sheets to be bound is placed on a table constituted of the top surface 50 of the stationary die block 45 and a shelf 70 connected to the die 45 so that its top surface forms a continuation of the die surface 50. Adjustably mounted on the table are two side guides 71,72, in FIG. 3, and an outer end guide 73; the three guides forming with the mandrel 40 a closed area for confining loosely the sheets of the book 15. It is to be noted more clearly in FIG. 6a of the drawings, that the mandrel 40 throughout the extent of the die block 45 is channeled to form a horizontal seat 74 providing an extension of the top surface 50 and a shoulder 75 forming an end stop for the end of the book to be bound. The shoulder 75 may be vertical, or preferably slightly convexly-shaped so that when the book end is pushed thereagainst the perforations 76 of the sheets will assume somewhat their bound arrangement, as is shown in FIG. 6a. It will be noted that such sheet perforations 76, though having a substantially greater area than that of the transverse die grooves 35,48, will for a juncture between the front open ends of such grooves. The grooves 35,48, the periphery of the mandrel 40, the book perforations 76, the rib die surfaces 52 and the adjoining portions of the grooves 25, will define circular passageways for the fingers 11 of the binder element 10 as such fingers are being formed into the binder rings 14.

With the book inserted in position on the machine in the manner indicated, the control mechanism of the machine is started to cause a binding element 10 to be cut and the straight fingers 11 thereof inserted into the closed grooves 25 of the block 27 and the tie-rods 12 thereof deposited in the longitudinal groove 28 of such block in the manner previously explained. The dog 60 is then actuated to the position shown in FIG. 5 to bring the working end thereof into locking engagement with the tie-rods 12 of the inserted binder element 10. The ram 57 advances to move the guide block 55 downwardly, causing the block 27 to slide downwardly on the rear face 31 of the die block 30 and on the rear face 47 of the die block 45, both of which surfaces are contained in the same vertical plane. During such downward movement of the block 27, the dog 60 will maintain the binder element 10 fixed with relation to such block through its hold on the tie-rods 12 of the binder contained in the longitudinal recess 27 of block 27. As the block 27 moves downwardly from the position shown in FIG. 5 to the position shown in FIG. 6, the upper ends of the ribs 51 will enter into the bottom ends of the closed grooves 25 containing the binder element fingers 11. When the die surfaces 52 on the upper ends of such ribs 51 come into engagement with the closed tips of the fingers 11, the latter will be bent outwardly of such grooves 25 and into the die grooves 48. The die surfaces 52 and grooves 48 will bend the fingers 11 into the circular configuration desired in the rings 14. As the closed tips of the bent curved finger portions emerge from the die grooves 48 they enter into the sheet perforations 76 of the loosely confined sheets and through their engagement with the edges of such perforations rearrange the book sheets to bring them to the arrangement they will have in the bound book. The formed ends of the fingers 11 on emerging from the book perforations 76 will enter into the die grooves 35 which will guide them around the mandrel 40 and to a position where the tips of the fingers will be located just at the juncture of the open ends of such fingers with the tie-rods 12. When the closed bent tips of the fingers 11 reach such position, they will have been formed into the binder rings 14 and the binding of the book will be completed. This final position of the binder fingers tips is possible of accomplishment because of the notches 63 provided in the working end of the dog 60. While not necessary to the binding of the book the die grooves 35 exercise a controlled action on the final form of the binder rings 14. As the formed ends of the fingers 11 emerge from the book perforations 76, due to the inherent resiliency of the wire, the fingers tend to spring back and expand the rings 14, which expansion may be uneven. The die grooves 35 prevents such springing back of the rings 14 and sets them into a permanently round form about a longitudinal center line, thus assuring that the pages of the book will be bound properly.

The control mechanism then operates the machine parts to raise the die block 30, the mandrel 40, the guide block 55 and the dog 60 to the positions shown in FIG. 4 of the drawings. With the coacting parts in such positions, the rings 14 of the formed binder element are released, and the bound book can readily be slid off the right side of the mandrel as viewed and shown in FIG. 8 of the drawings.

Instead of constructing the machine to operate with a solid mandrel such as the above described mandrel 40, the machine may be constructed to provide a split mandrel enabling the book to be withdrawn from the machine in a direction opposite to that in which it has been inserted. A binding machine provided with a split mandrel and embodying the invention is shown in FIGS. 10–16 of the drawings. Since the machine of FIGS. 10–16 is essentially the same as that shown in FIGS. 1–9 of the drawings, the showing of FIGS. 10–16 has been limited to the mechanism for forming the binding operation and of which the split mandrel forms an integral part thereof. Further, the parts shown in FIGS. 10–16, which correspond to the parts of FIGS. 1-9 have been given similar reference designations.

Figure 10:
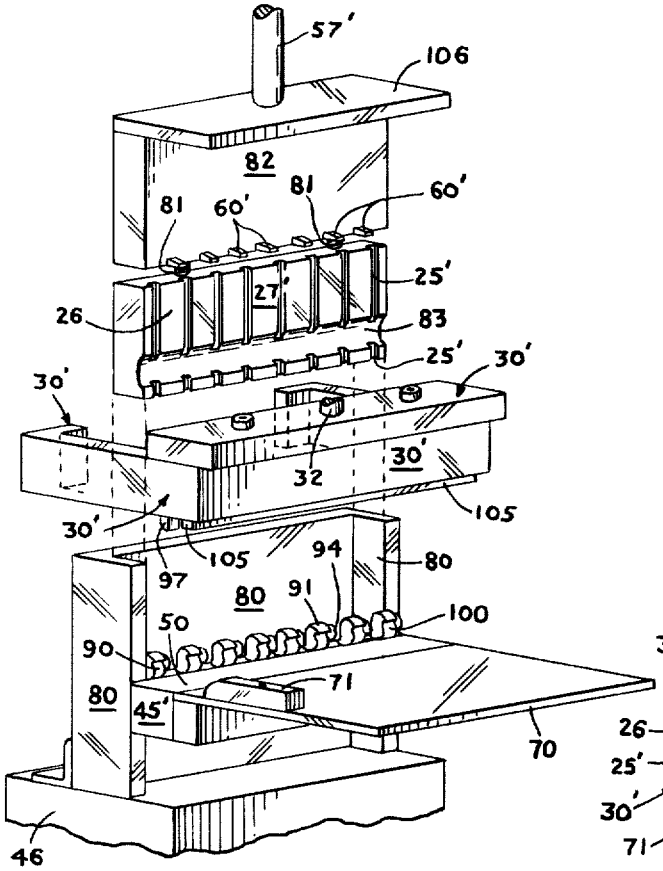
FIG. 10 is a front, prospective, exploded elevation of another embodiment of the invention.
Figure 12:
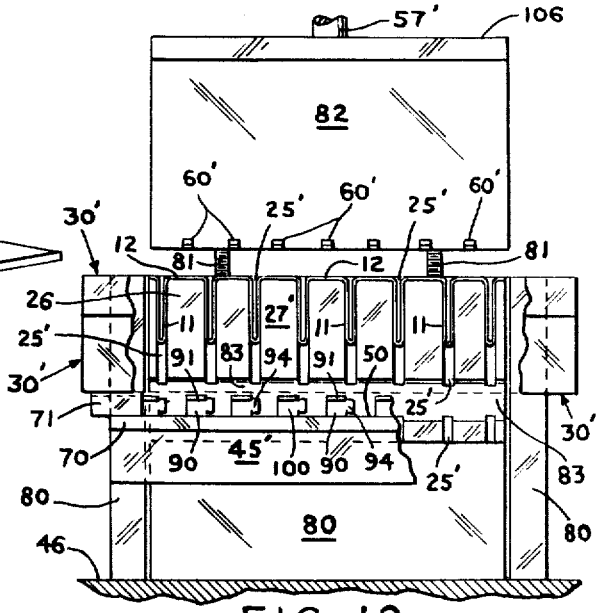
FIG. 12 is a front view, partly broken away, of the binding parts shown in FIG. 10.
Figure 13:
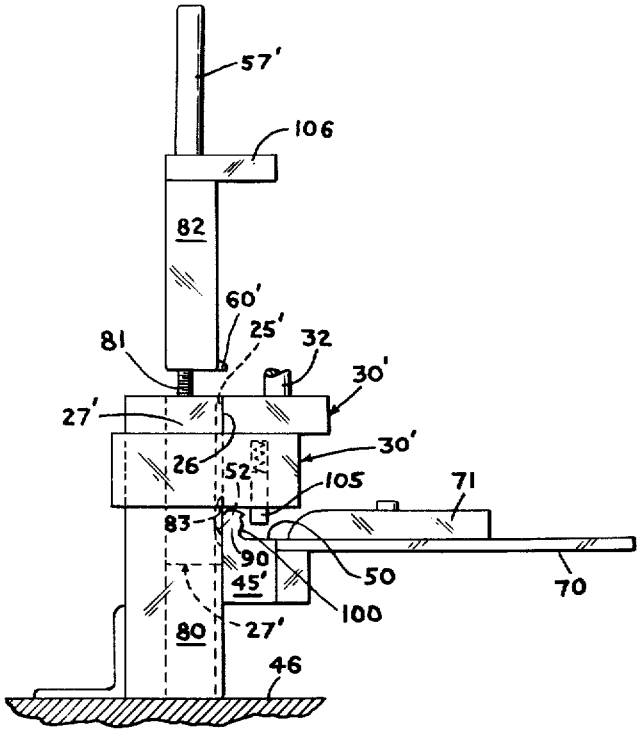
FIG. 13 is a side elevational view of the parts shown in FIGS. 10-12.
Figure 14:
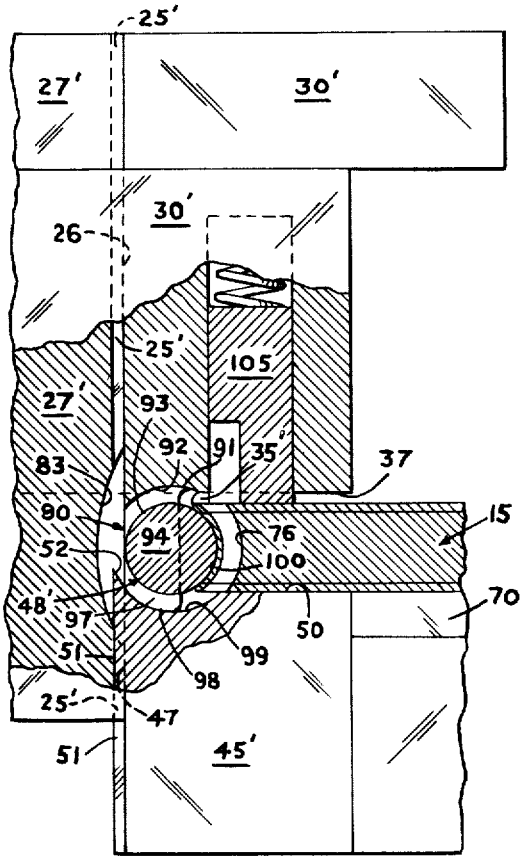
FIG. 14 is an enlarged sectional view, looking along the line 14—14 of FIG. 15, and showing the relation of the binding parts at the end of a binding operation.

The machine of FIGS. 10-16 comprises a stationary die block 45' mounted on a guide block 80 fixed to a frame 46 of the machine in any suitable manner (see FIGS. 10 and 13). The rear face 47 of the die block 45' has a plurality of projecting guide ribs 51 provided at their tops with die surfaces 52 and slidable in the vertical grooves 25' formed in the front surface 26 of a slide block 27'. The slide block 27' is vertically slidable in the guide block 80 fixed to the frame 46 of the machine and is supported in suspended condition in such guide block by a pair of vertical rods 81 connected at their upper ends to a vertical frame 82 provided at its upper end with a horizontal plate 106 to which is secured the lower end of a ram rod 57'. The frame 82 is provided along its lower edge with spaced holding members 60' for clamping against the top surface of the block 27' the tie-rods 12 of a binder element 10 whose straight fingers 11 have been inserted into the grooves 25' (note FIG. 12). Unlike the previously described block 27, the ribs 51 of the block 45' are in sliding engagement with the grooves 25' of the block 27' throughout the range of vertical movement of the block 27'. When entirely retracted, with the holding members 60' spaced above the top surface of such block 27' sufficiently to permit the supply of a binder element such as shown in FIG. 1 thereto, the top surface of block 27' will be flush with the top surface of the die block 30' which is vertically actuated in the manner of the previously described die block 30. This condition of the blocks shown in FIGS. 12, 13 and 16 of the drawings. As will be observed in FIGS. 10 and 14 of the drawings, the front face 26 of the block 27' is provided with a horizontal arcuate groove 83 which cuts across the vertical grooves 25' in such face 26 so as to be located in the region of the upper ends of the ribs 51 on the die block 45 in the aforesaid condition of the parts. When the block 27' is entirely advanced, it will have moved downwardly to the extent that the top surface thereof is adjacent to the upper terminal ends of the ribs 51 at which time the binding operation will have been completed.

The split mandrel of the machine shown in FIGS. 10-16 is formed by parts integral with the opposed upper and lower ends of the die blocks 45' and 30' respectively. It will be seen more clearly in FIGS. 14-16 of the drawings, that the die block 45' is provided along the rear edge of its top face 50 with a plurality of spaced, aligned mandrel segments 90 having upper curved surfaces 91 which engage with comparable curved, spaced, aligned curved surfaces 92 provided along the rear edge of the bottom face 37 of the die block 30' when the block 30' is in its fully advanced or lowermost position. The rear ends of the curved surfaces 92 extend below the overall area of the bottom surface 37 of the die block 30' to provide a longer guiding surface as will hereinafter become more clear. The guide surfaces 92 each have a width substantially equal to the combined width of an associated mandrel segment 90 and a reduced portion 94 of such segment and projects beyond the curved surface 91 of such segment 90 to overlie, in spaced relation, the exterior curved surface 93 of such reduced portion 94 and the die surface 52 on the upper end of the associated rib 51 which is also disposed in spaced coactive relation with said reduced portion surface 93. The spaces between the outer ends of such reduced segment portions 94 and the other side faces of adjacent mandrel segments 90 are, in the closed condition of the dies 30', 45', filled by a series of spaced depending mandrel segments 97 having lower end curved surfaces 98 which engage with comparable, spaced, aligned curved surfaces 99 provided in the upper surface 50 of die block 45' between the mandrel segments 90. Like the curved surfaces 92, the curved surfaces 99 are sufficiently wide enough to that one end portion thereof overlie, in spaced relation, the die surfaces 93 formed by the reduced mandrel portions 94. In the region of the ribs 51, the curved surfaces 99 are continuous with the curved surfaces 52 provided on the upper ends of such ribs. It will thus be understood that when the die blocks 30', 45' are closed, with the mandrel segments 97 interposed with the mandrel segments 90, the opposed sides of such segments, the curved surfaces 93 of the reduced mandrel portions 94, the portions of the surfaces 92 overlying such surfaces 93 and the portions of the surfaces 99 underlying such surfaces 93, fill form upper and lower die passages 35', 48', respectively (note FIGS. 14 and 15). The rear ends of the die passages 35', 48', as in the case of the previously described die passages 35 and 48, respectively, communicate with the vertical grooves 25', and the front ends of such passages 35',48' communicate with the aligned perforations 76 in the sheets of the book 15. The book 15 of loose sheets is placed in position on the shelf 70 with one side of the book against the side guide 71 and the edge thereof to be bound engaging the front common faces 100 of the mandrel segments 90. The mandrel faces 100 are preferably configured to rearrange the sheets of the book so that the perforations 76 thereof form passageways conforming somewhat in shape to the forms in which the binder element fingers 11 are to be bent. The front curved surface portions of the reduced portions 94 of the mandrel segments 90 are substantially flush with the central convex portions of the faces 100 on the segments 90 (note FIG. 14). The front faces of the depending mandrel segments 97 are vertical faces, but they are spaced rearwardly from the mandrel faces 100 and do not come into engagement with the edge of the book that is to be bound.

Figure 15:
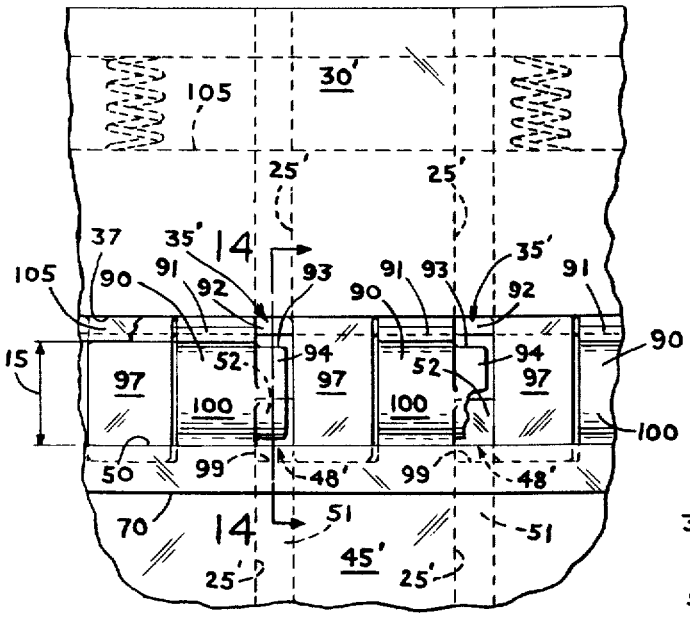
FIG. 15 is a partial front view, partly broken away, of the binding mechanism shown in FIG. 14.
Figure 16:
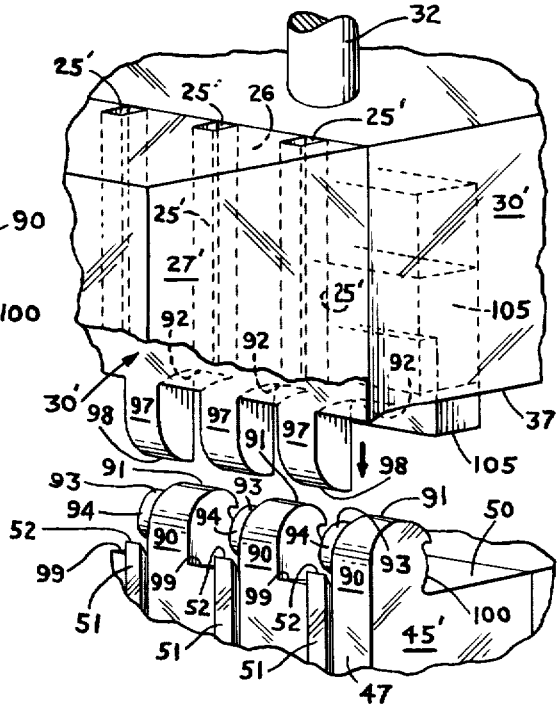
FIG. 16 is a perspective, partly broken away, detailed view of portions of the mechanism shown in FIG. 14.

It will be understood from the foregoing, that at the start of a machine cycle, the parts of the machine are in the positions shown in FIG. 13, with the mandrel parts separated as is shown more clearly in FIG. 16 of the drawings. A book of sheets 15 is placed on the shelf 70 with one side thereof in engagement with the side guide 71, and the side thereof to be bound in engagement with the mandrel surfaces 100. In FIG. 15 of the drawings, the location of the book is indicated by the double arrow designated 15. On starting the cycle of operation of the machine, a binding element 10 such as shown in FIG. 1, is cut and inserted into the slots 25' of the block 27' in the manner explained in the description of the machine shown in FIGS. 1-9 of the drawings. The ram, of which the rod 57' forms a part, then advances to move the frame 82 downwardly. The bolts 81 are loosely connected to the frame 82 and the frictional contact of the block 27' with the guide block 80 is sufficient to cause an initial movement of the frame 82 without a consequent movement of the block 27' until the holding members 60' on such frame clamp down on the tie rods 12 of binding element 10 supplied to the block 27'. The block 27' will thereupon be advanced with the binding element clamped in position for the binding operation. As the block 27' advances, the die block 30' will be simultaneously advanced downwardly toward the die block 45' to cause before any binding operation commences, the interengagement of the mandrel segments 90 and 97 in the assembly of the mandrel for such operation. The die block 30' is provided adjacently to the front ends of the aligned series of curved surfaces 92, a plurality of spring pressed plungers 105 which come into engagement with the top sheet of the book 15 as the interengagement of the mandrel segments 90,97 takes place to hold the sheets of the book in the form in which they have been rearranged, during the binding operation. The assembly of the die will be completed and the advancing movement of the die block 30' will end when the surfaces 91 of the segments 90 engage the curved surfaces 92, and the surfaces 98 of the segments 97 engage the curved surfaces 99 on the upper surface 50 of the die block 45'. The frame 82 and the block 27', however, will continue their downward movement to perform the binding operation in the manner previously described with respect to the embodiment shown in FIGS. 1 to 9 of the drawings. When the binding operation is completed, the holding members 60' and the blocks 27' and 30' will be withdrawn in the manner previously described with respect to the holding member 60 and the blocks 27 and 30, respectively. As in the case of the previously described machine with respect to the groove 28 in which the released binder portions 12 are located, when the block 27' initiates its upward movement, the completed circular elements 14 will be rotated slightly about the mandrel to enable the binder portions 12 to become unseated from the top of the block 27'. In this construction, the withdrawing movement of the block 27' is controlled to bring it to a stop when the horizontal groove 83 on the grooved face 26 of such block moves into position in back of the mandrel and the formed binder thereon. As has been indicated the bending of the straight fingers 11 of the binding element into the circular elements 14 of the completely formed binder element takes place about the reduced portions 94 of the mandrel segments 90. Consequently, when the die block 30' is retracted at the end of a binding cycle, the spaces left by the withdrawl of the mandrel segments 97 and the space provided by the grooves 83 will enable the circular elements 14 to be readily disengaged from the mandrel segments 90 simply by shifting the book slightly to move the elements 14 off the reduced mandrel portions 94 and into the spaces left by the withdrawn mandrel segments 97 between the outer ends of such portions 92 and the spaced other side walls of the adjacent segments 90. The book can then be withdrawn in a direction opposite to that in which it was inserted into the machine for binding.

While I have hereinabove described and illustrated in the drawings, two embodiments of my invention, it will readily be understood by those skilled in the art, that other embodiments may be constructed without departing from the spirit of the invention or the scope of the appended claims.

I claim:

1. A machine for binding a book of loose perforated sheets with a wire binder composed of a [continuous] piece of wire having a plurality of reversely disposed loops formed as straight parallel fingers and connected together at their roots by longitudinal portions to form a flat comb-like structure, comprising a binding station, means for supporting a binder so that the straight binder fingers thereof with the tips of the fingers foremost are directed toward said station in proper position for entry through the perforations of the book of sheets to be bound, *means for feeding binders of a desired length to said supported proper position, including means for advancing a continuous length of such wire and for automatically severing such desired binder lengths from the leading end of said continuous length of wire,* means engageable with the longitudinal portions of [the] *a severed so supported* binder for pushing the straight binder fingers thereof lengthwise into said station with the tip ends of said fingers in leading position, and means operative at said binding station as the straight binder fingers [ae] *are* pushed thereinto for progressively bending the straight fingers under the pressure of said pushing means into circular form starting with the tip ends thereof so that the bent finger portions progressively pass into and through the means including restraining means for each straight binder finger operative to prevent the portions thereof between said pushing means and said operative means becoming bent during the pushing action of said pushing means and until such portions reach said operative means, and said pushing means maintaining an advancing force on the binder fingers only until the tip ends thereof become situated in the gaps at the roots of the fingers between the longitudinal portions of the binder.

2. A machine as defined in claim 1, in which said operable means comprises a series of longitudinally spaced, curved narrow die surfaces aligned with the straight binder fingers of a binder on said supporting means and having entry ends located in the path of movement of such fingers toward the binding station so as to intercept the same, and a plurality of mandrel portions coactable with said die surfaces to bend the straight fingers and direct the bent finger portions into the perforations of the book of sheets to be bound.

3. A machine as defined in claim 1, in which said supporting means comprises a member having a vertical surface and in which said restraining means comprises a plurality of spaced, vertically disposed straight finger positioning means provided on said vertical surface and each operative to prevent the straight portions of the finger associated therewith being bent during the pushing action of said pushing means.

4. A machine as defined in claim 3, in which said vertically disposed positioning means on said member consist of a plurality of vertical grooves for receiving the straight fingers of the binder.

5. A machine as defined in claim 3, including means for confining the straight binder fingers to said positioning means on said member as said fingers are advanced by said pushing means to said binding station.

6. A machine as defined in claim 5, in which said pushing means comprises means for clamping the longitudinal portions of the binder to said member, and means to advance said member and said clamping means in unison relative to said binding station, whereby the binder is in stationary condition relative to said supporting means during the binding of the fingers thereof.

7. A machine as defined in claim 1, in which said supporting means comprises a first member movable from a retracted position toward said binding station and having a vertically disposed face in which is provided vertical grooves for receiving the straight fingers of the binder, and including a second member having a vertically disposed face slidable on the vertical face of said first member and covering the open sides of the portions of the vertical grooves containing the binder fingers in the retracted position of said first member, said vertical grooves and the vertical face of said second member constituting said restraining means, said first and second members being movable relative to each other to progressively expose to said operative means the advancing portions of the straight binder fingers in such covered portions of the vertical grooves during the advancing movement of said first member.

8. A machine as defined in claim 7, including means for moving said second member from a retracted position in which it is withdrawn from said binding station, toward said binding station prior to the operation of said operable means in each cycle of the machine.

9. A machine as defined in claim 3 in which said operable means comprises a horizontally disposed mandrel located at said binding station and extending in adjacent relation across the vertical surface of said member, and die means associated with said mandrel and providing a plurality of spaced curved bending surfaces transverse to and coactable with said mandrel to progressively bend the binder fingers as said pushing means is advanced, said spaced bending surfaces being aligned and cooperative with the vertically disposed finger positioning means on the vertical surface of said member to progressively receive the advancing straight finger portions from said finger positioning means.

10. A machine as defined in claim 4, in which said operable means comprises a horizontally disposed mandrel located at said binding station and extending in adjacent relation across the grooved face of said member, and die means associated with said mandrel and providing a plurality of spaced curved bending surfaces transverse to and coactable with said mandrel to progressively bend the binder fingers as said pushing means is advanced, said spaced bending surfaces being aligned and cooperative with said vertical grooves to progressively receive the advancing straight finger portions from said vertical grooves, and said spaced bending surfaces each having a leading edge portion extending into the cross-sectional area of its associated vertical groove and progressively bending the straight finger in such groove out of the same and between the associated bending surface and the mandrel as said pushing means is advanced.

11. A machine as defined in claim 10, in which such leading edge [portion] *portions* of said bending surfaces are provided on the ends of guide elements engageable with the vertical grooves of said member.

12. A machine as defined in claim 10, in which said engageable means comprises spaced portions engageable with the longitudinal portions of the binder with the spaces therebetween in registry with the vertical grooves of said member, and in which said die means comprises a second die member disposed on the other side of the book to be bound and having edge portions coactable with said mandrel and located adjacent to the grooved face of said member, said edge portions of said second die member being provided with spaced curved guide surfaces transverse and coactable with said mandrel and arranged to have one of their ends in registration with the perforations in the book to be bound and the other ends thereof in registration with the vertical grooves of said member and in communication with such groove through the spaces in said engageable means, whereby the tip ends of the bent fingers are brought into registry with the gaps at the roots of the fingers.

13. A machine as defined in claim 9, in which said mandrel is a split mandrel composed of a series of spaced, aligned mandrel elements, and means supporting said mandrel elements in coactive relation to said curved bending surfaces.

14. A machine as defined in claim 13, in which said mandrel supporting means comprises a plurality of spaced supporting members aligned with said mandrel elements and connected at one end to one end of the mandrel elements, and including a plurality of spaced aligned second mandrel members, removably insertable into the spaces between the other ends of said first mentioned mandrel elements and supporting members.

15. A machine as defined in claim 14, including a book support, and in which each connected supporting member and first mentioned mandrel element are integrally formed, said first mentioned mandrel element being reduced in relation to the supporting member, and said supporting member being configured to form a stop for the edge of a book placed on said book support to be bound.

16. A machine as defined in claim 9, in which said spaced curved bending surfaces are provided on a die member disposed to one side of a book to be bound, said die means including a second die member disposed on the other side of the book to be bound and provided with spaced curved guide surfaces transverse and coactable with said mandrel and arranged to have one of their ends in registration with the perforations in the book to be bound and the other ends thereof in registration with the positioning means of said member, and in which said mandrel is a split mandrel composed of a series of spaced, aligned first mandrel elements mounted on said first mentioned die member intermediate said edge portions of the latter and having reduced binder forming portions overlying said edge portions in spaced relation, and a series of spaced aligned second mandrel elements mounted on said second die member and removably insertable into the spaces between said first mandrel elements.

17. A machine for binding a book of loose perforated sheets with a binder composed of straight parallel fingers connected together at their roots by longitudinal portions to form a flat comb-like structure, comprising a binding station, means for supporting a binder so that the straight binder fingers thereof with the tips of the fingers foremost are directed toward said station in proper position for entry through the perforations of the book of sheets to be bound, *means for feeding binders of a desired length to said supported proper position, including means for advancing a continuous length of such wire and for automatically severing such desired binder lengths from the leading end of said continuous length of wire,* means for pushing the straight binder fingers *of a severed so supported binder* lengthwise into said station with the tip ends of said fingers in leading position, and means operative at said binding station as the straight binder fingers are pushed thereinto for progressively bending the straight fingers into circular form starting with the tip ends thereof and directing the bent finger portions through the perforations of the book of sheets to bind the same, said operable means comprising a series of longitudinally spaced, curved die grooves aligned with the straight binder fingers of a binder on said supporting means and having entry ends located in the path of movement of such fingers toward the binding station so as to intercept the same, and a plurality of mandrel portions coactable with said die grooves to bend the straight fingers and direct the bent finger portions into the perforations of the book of sheets to be bound, said mandrel portions forming part of a rod-like member having one free end, means supporting the other end of said member and operable to move said member into and out of operable position relative to said die grooves to enable respectively, the binding operation to take place and the discharge of the bound book off the free end of said member.

18. A machine for binding a book of loose perforated sheets with a binder composed of straight parallel fingers connected together at their roots by longitudinal portions to form a flat comb-like structure, comprising a binding station, means for supporting a binder so that the straight binder fingers thereof with the tips of the fingers foremost are directed toward said station in proper position for entry through the perforations of the book of sheets to be bound, *means for feeding binders of a desired length to said supported proper position, including means for advancing a continuous length of such wire and for automatically severing such desired binder lengths from the leading end of said continuous length of wire,* means for pushing the straight binder fingers *of a severed so supported binder* lengthwise into said station with the tip ends of said fingers in leading position, and means operative to said binding station as the straight binder fingers are pushed thereinto for progressively bending the straight fingers into circular form starting with the tip ends thereof and directing the bent finger portions through the perforations of the book of sheets to bind the same, said operable means comprising a series of longitudinally spaced, curved die grooves aligned with the straight binder fingers of a binder on said supporting means and having entry ends located in the path of movement of such fingers toward the binding station so as to intercept the same, and a plurality of mandrel portions coactable with said die grooves to bend the straight fingers and direct the bent finger portions into the perforations of the book of sheets to be bound, said mandrel portions being spaced apart longitudinally and are movable as a whole longitudinally into operative binding position with respect to said die grooves and to retract such mandrel portions from said die grooves so as to enable the bent fingers to be disengaged from said operable means.

19. A machine for binding a book of loose perforated sheets with a binder composed of straight parallel fingers connected together at their roots by longitudinal portions to form a flat comb-like structure, comprising a binding station, means for supporting a binder so that the straight binder fingers thereof with the tips of the fingers foremost as directed toward said station in proper position for entry through the perforations of the book of sheets to be bound, *means for feeding binders of a desired length to said supported proper position, including means for advancing a continuous length of such wire and for automatically severing such desired binder lengths from the leading end of said continuous length of wire,* means for pushing the straight binder fingers *of a severed so supported binder* lengthwise into said station with the tip ends of said fingers in leading position, and means operative at said binding station as the straight binder fingers are pushed thereinto for progressively bending the straight fingers into circular form starting with the tip ends thereof and directing the bent finger portions through the perforations of the book of sheets to bind the same, said supporting means comprising a member having a vertically disposed face in which is provided vertical grooves for receiving the straight fingers of the binder, and said operable means comprising a horizontally disposed mandrel located at said binding station and extending in adjacent relation across the grooved face of said member, and die means associated with said mandrel and providing a plurality of spaced curved bending surfaces transverse to and coactable with said mandrel to progressively bend the binder fingers contained in said vertical grooves as said supporting means is advanced, said die means comprising a die member disposed on one side of a book to be bound and having edge portions coactable with said mandrel and located adjacent to the grooves face of said member, said edge portions being provided with said curved bending surfaces constructed so that one end of said bending surfaces extend into said vertical grooves and the other ends thereof register with the perforations in the book to be bound, said mandrel being a rod-like member separate from said die member, and said edge portions of said die member being joined by a longitudinally extending curved recess providing a seat for said mandrel, said curved bending surfaces being in the form of transverse grooves in said recess, and means connected to one end of said mandrel and operative to seat said mandrel in said recess at the start of a machine cycle and to unseat said mandrel from said recess when the book is bound to permit removal of the latter from the other end of the mandrel.

20. A machine for binding a book of loose perforated sheets with a binder composed of straight parallel fingers connected together at their roots by longitudinal portions to form a flat comb-like structure, comprising a binding station, means for supporting a binder so that the straight binder fingers thereof with the tips of the fingers foremost are directed toward said station in proper position for entry through the perforations of the book of sheets to be bound, *means for feeding binders of a desired length to said supported proper position, including means for advancing a continuous length of such wire and for automatically severing such desired binder lengths from the leading end of said continuous length of wire,* means for pushing the straight binder fingers *of a severed so supported binder* lengthwise into said station with the tip ends of said fingers in leading position, and means operative at said binding station as the straight binder fingers are pushed thereinto for progressively bending the straight fingers into circular form starting with the tip ends thereof and directing the bent finger portions through the perforations of the book of sheets to bind the same, said supporting means comprising a member having a vertically disposed face in which is provided vertical grooves for receiving the straight fingers of the binder, and said operable means comprising a horizontally disposed mandrel located at said binding station and extending in adjacent relation across the grooved face of said member, and die means associated with said mandrel and providing a plurality of spaced curved bending surfaces transverse to and coactable with said mandrel to progressively bend the binder fingers contained in said vertical grooves as said supporting means is advanced, said mandrel being a split mandrel composed of a series of spaced, aligned mandrel elements, and means supporting said mandrel elements in coactive relation to said curved bending surfaces.

21. A machine as defined in claim 20, in which said mandrel supporting means comprises a plurality of spaced supporting members aligned with said mandrel elements and connected at one end to one end of the mandrel elements, and including a plurality of spaced aligned second mandrel members, removably insertable into the spaces between the other ends of said first mentioned mandrel elements and supporting members.

22. A machine as defined in claim 21, including a book support, and in which each connected supporting member and first mentioned mandrel element are integrally formed, said first mentioned mandrel element being reduced in relation to the supporting member, and said supporting member being configured to form a stop for the edge of a book support to be bound.

23. A machine as defined in claim 20, in which the grooved face of said first member is provided with a horizontal groove located on said face to be positioned at said forming station in the retracted position of said first means and having a cross-sectional dimension enabling the completely formed fingers to be shifted off said mandrel elements.

24. A machine for binding a book of loose perforated sheets with a binder composed of straight parallel fingers connected together at their roots by longitudinal portions to form a flat comb-like structure, comprising a binding station, means for supporting a binder so that the straight binder fingers thereof with the tips of the fingers foremost are directed toward said station in proper position for entry through the perforations of the book of sheets to be bound, *means for feeding binders of a desired length to said supported proper position, including means for advancing a continuous length of such wire and for automatically severing such desired binder lengths from the leading end of said continuous length of wire,* means for pushing the straight binder fingers *of a severed so supported binder* lengthwise into said station with the tip ends of said fingers in leading position, and means operative at said binding station as the straight binder fingers are pushed thereinto for progressively bending the straight fingers into circular form starting with the tip ends thereof and directing the bent finger portions through the perforations of the book of sheets to bind the same, said supporting means comprising a member having a vertically disposed face in which is provided vertical grooves for receiving the straight fingers of the binder, and said operable means comprising a horizontally disposed mandrel located at said binding station and extending in adjacent relation across the grooved face of said member, and die means associated with said mandrel and providing a plurality of spaced curved bending surfaces transverse to and coactable with said mandrel to progressively bend the binder fingers contained in said vertical grooves as said supporting means is advanced, said die means comprising a die member disposed on one side of a book to be bound and having edge portions coactable with said mandrel and located adjacent to the grooved face of said member, said edge portions being provided with said curved bending surfaces constructed so that one end of said bending surfaces extend into said vertical grooves and the other ends thereof register with the perforations in the book to be bound, a second die member disposed on the other side of the book to be bound and having edge portions coactable with said mandrel and located adjacent to the grooved face of said member, said edge portions of said second die member being provided with spaced curved guide surfaces transverse and coactable with said mandrel and arranged to have one of their ends in registration with the perforations in the book to be bound and the other ends thereof in registration with the vertical grooves of said member, said mandrel being a split mandrel composed of a series of spaced, aligned first mandrel elements mounted on said first mentioned die member intermediate said edge portions of the latter and having reduced binder forming portions overlying said edge portions in spaced relation, and a series of spaced aligned second mandrel elements mounted on said second die member and removably insertable into the spaces between said first mandrel elements.

*25. A machine for binding a book of loose perforated sheets with a binder composed of straight parallel fingers connected together at their roots by longitudinal portions to form a flat comb-like structure, comprising a binding station, means for supporting a binder so that the straight binder fingers thereof with the tips of the fingers foremost are directed toward said station in proper position for entry through the perforations of the book of sheets to be bound, means for feeding binders of a desired length to said supported proper position, including means for advancing a continuous length of such wire and for automatically severing such desired binder length from the leading end of said continuous length of wire, means for pushing the straight binder fingers of a severed so supported binder lengthwise into said station with the tip ends of said fingers in leading position, and means operative at said binding station as the straight binder fingers are pushed thereinto for progressively bending the straight fingers into circular form starting with the tip ends thereof and directing the bent finger portions through the perforations of the book of sheets to bind the same, said operable means comprising a series of longitudinally spaced, curved die surfaces aligned with the straight binder fingers of a binder on said supporting means and having entry ends to which such fingers are directed as they are advanced by said pushing means, and a plurality of longitudinally spaced apart mandrel portions coactable with said die surfaces to bend the advancing straight fingers and direct the bent finger portions into the perforations of the book of sheets to be bound, said mandrel portions and said die surfaces being movable relative to the other to bring them into operative relation for bending the fingers and to enable the bent fingers to be disengaged from said operable means.*

*26. A machine as defined in claim 25, in which said supporting means includes restraining means for the straight binder fingers operative to prevent the portions of the straight fingers between said pushing means and said operative means becoming bent during the advancement of said fingers to said binding station by said pushing means.*

* * * * *

UNITED STATES PATENT AND TRADEMARK OFFICE

CERTIFICATE OF CORRECTION

PATENT NO. : RE 30,491

DATED : January 27, 1981

INVENTOR(S) : Albert Gomez

It is certified that error appears in the above-identified patent and that said Letters Patent are hereby corrected as shown below:

Column 10, line 14, after "the" and before "means" insert perforations of the book of sheets, said supporting Column 13, line 23 after "operative" delete [to] and insert at Column 13, line 49, after "foremost" delete [as] and insert are Signed and Sealed this Ninth Day of June 1981

[SEAL]

Attest:

RENE D. TEGTMEYER

Attesting Officer

Acting Commissioner of Patents and Trademarks